United States Patent [19]

Biggerstaff

[11] Patent Number: 4,934,179
[45] Date of Patent: Jun. 19, 1990

[54] PIPE INSPECTION METHOD AND DEVICE

[76] Inventor: Bruce A. Biggerstaff, 615 W. Mt. Pleasant Rd., Evansville, Ind. 47711

[21] Appl. No.: 392,196

[22] Filed: Aug. 10, 1989

Related U.S. Application Data

[63] Continuation-in-part of Ser. No. 233,249, Aug. 17, 1988, Pat. No. 4,866,978.

[51] Int. Cl.$^5$ .............................................. G01M 3/28
[52] U.S. Cl. .................................................. 73/40.5 R
[58] Field of Search ................. 73/40.5 R, 865.8, 37.9, 73/40.5 A; 33/302, 544

[56] References Cited

U.S. PATENT DOCUMENTS

| | | | |
|---|---|---|---|
| 3,439,527 | 4/1969 | Rohrer | 73/40.5 A |
| 4,000,655 | 1/1977 | Jones | 73/37.9 X |
| 4,367,646 | 1/1983 | Allen, Sr. et al. | 73/37.9 |
| 4,567,514 | 1/1986 | Morgan et al. | 73/40.5 R X |

Primary Examiner—Hezron E. Williams
Assistant Examiner—Joseph W. Roskos
Attorney, Agent, or Firm—Woodard, Emhardt, Naughton, Moriarty & McNett

[57] ABSTRACT

A method and device for inspecting the internal cross-sectional shape of pipes, and particularly of sewer pipes. A mandrel is inserted into the pipe. The mandrel may include an elastomeric member providing a fluid seal engaging the internal pipe surface. The mandrel also has a retrieval cord attached thereto and trailing therebehind. A plug member is provided behind the mandrel, which may be inflatably expanded to define a second fluid seal with the pipe. The space between the pipe and the two fluid seals is pressurized, such as with compressed air, causing the mandrel to advance along the pipe, pulling the retrieval cord as it advances. The mandrel's advancement will be stopped by a sufficiently large deformation. Thereafter, the mandrel is retrieved by pulling on the retrieval cord. In one specific embodiment of the device, a mandrel, including a flexible elastomeric member, is provided that is capable of ready modification to accommodate various diameter pipes. In addition, an elastomeric member is disclosed which is a single piece diaphragm for engagement with the mandrel.

18 Claims, 7 Drawing Sheets

PIPE INSPECTION METHOD AND DEVICE

REFERENCE TO RELATED APPLICATIONS

This application is a continuation-in-part of my co-pending patent application Ser. No. 233,249, filed Aug. 17, 1988, now U.S. Pat. No. 4,866,978.

BACKGROUND OF THE INVENTION

The present invention deals generally with pipe inspection, and more specifically with inspection of the internal cross-sectional shape of pipes.

Sewer pipes placed underground may be partially collapsed or deflected under the weight of soil or other loads. Such pipes, typically having a round cross-sectional shape when not deformed, become unsatisfactory when they are deformed too much. Various government ordinances require inspection of such pipes to ensure deflection does not exceed, for example, 5 percent. This problem of deflection is especially present with certain types of pipes, such as polyvinyl chloride (PVC) pipes, popular for selected applications.

Accordingly, sewer pipes need to be inspected to ensure that they have not unduly deformed or collapsed. Various methods presently exist for conducting such inspections which, in my typical experience, require a crew of four persons to inspect about 3,000 linear feet of sewer pipe per workday. The present invention allows for more than a four fold increase in productivity, requiring only two persons to inspect about 7,000 linear feet of sewer pipe per day.

Prior sewer inspection techniques involve pulling a mandrel by a cord through the pipe to be inspected. However, prior to pulling the mandrel through the sewer pipe, the inspectors have to thread the cord through the pipe ahead of the mandrel. This threading is done in a variety of manners, including directing an electric toy car with a string attached thereto through the pipe, floating a buoyant device with a string attached thereto down the sewer pipe, or blowing a parachute with a line attached thereto down the pipe with an air compressor. After this initial line is thread down the pipe, an operator at the downstream end of the sewer pipe pulls the mandrel through the pipe until a point where a deformation is encountered. These techniques require the labor intensive step of initially threading the line down the sewer pipe before the mandrel can even be run through for inspection. This requires having personnel at both the upstream and downstream ends of the pipe which is being inspected.

U.S. Pat. No. 2,782,370 discloses a device which has two members which both travel down a pipe for detecting electrical current irregularities which evidence potential corrosion leaks.

U.S. Pat. No. 4,354,379 discloses a device for testing the roundness of oil well pipe segments by projecting, under air pressure, a free floating drift through the pipe. U.S. Pat. No. 4,354,379 alternatively discloses the conventional approach discussed above of pulling the drift through the pipe using a cable in front of the drift.

The present invention provides a unique combination particularly well-suited for inspecting underground pipes such as sewers. The present inventive method may be conducted either from the upstream end of the pipe to be inspected or from the downstream end. The inventive method is rapid and efficient compared to prior methods. Particularly, a specially adapted mandrel is inserted into the pipe. The mandrel has a retrieval cord attached to it which trails behind the mandrel and which is preferably wound up on a reel. A plug member is fixed in the pipe behind the mandrel. A pressurized fluid, such as compressed air, is then forced in the space between the plug and the mandrel, propelling the mandrel along the pipe away from the plug. The mandrel is advanced as much as five hundred or more feet, trailing the retrieval cord behind it as it advances. After the mandrel has advanced the full length of the pipe to be inspected without stopping at a deformation, the mandrel is removed at the next manhole. If the mandrel stops before reaching the next manhole at a sufficiently small deformation in the pipe, the pressure is turned off and the mandrel is retrieved by pulling on the retrieval cord. As stated above, this technique may provide as much as a four fold increase in productivity, and is a significant advance in the art.

SUMMARY OF THE INVENTION

According to one embodiment, the present invention provides a method for inspecting the internal cross-sectional shape of pipes comprising the steps of inserting a mandrel into a pipe having an internal pipe surface, the mandrel having first means for providing a fluid seal engaging the internal pipe surface, the mandrel having a retrieval cord attached thereto and trailing behind the mandrel; fixing a plug member in the pipe behind the mandrel, the plug member having a second means for providing a fluid seal with the pipe, wherein the first means for providing a fluid seal, the second means for providing a fluid seal and the internal pipe surface collectively define a pressuring space therebetween; and propelling the mandrel along the pipe away from the plug member by pressurizing the pressurizing space with a fluid, wherein the retrieval cord trails behind the mandrel during the propelling step.

According to another embodiment, the present invention also provides a device for inspecting the internal cross-sectional shape of pipes comprising a mandrel adapted to be inserted into a pipe having an internal pipe surface, the mandrel having first means for providing a fluid seal engaging the internal pipe surface; a retrieval cord attached to the mandrel and adapted to trail behind the mandrel; a plug member adapted to be fixed in the pipe behind the mandrel, the plug member having second means for providing a fluid seal with the pipe, wherein the first means for providing a fluid seal, the second means for providing a fluid seal and the internal pipe surface collectively define a pressuring space therebetween; and means for pressurizing the pressurizing space, wherein the mandrel is propellable along the pipe away from the plug member with the first means for providing a fluid seal being freely movable along the internal pipe surface upon pressuring the pressuring space, and wherein the retrieval cord trails behind the mandrel between the mandrel and the plug member.

The present invention also provides a mandrel for use in inspecting the internal cross-sectional shape of pipes comprising a forward radial support member having a first circumference; a rearward radial support member having a second circumference; a plurality of arms rigidly connected to the forward radial support member and to the rearward radial support member, the arms being disposed around the first circumference and around the second circumference, wherein the arms run longitudinally between the forward and rearward support members, and wherein the arms are bent radially inward at a front end near the forward radial support member, and wherein the arms are bent radially inward at a rear end near the rearward radial support member; and an elastomeric diaphragm fixed with respect to the arms and having a circular profile for forming a fluid seal along the internal surface of the pipe to be inspected.

In another embodiment, the present invention provides a mandrel for use in inspecting the internal cross-sectional shape of pipes comprising a forward radial support member having a first circumference and a rearward radial support member having a second circumference, the first circumference and the second circumference having a first diameter. The mandrel further includes a forward extension plate having a third circumference and a rearward extension plate having a fourth circumference, the third and fourth circumferences having a diameter larger than the first diameter of the first and second circumferences. Means are provided for attaching the forward and rearward extension plates to the forward the rearward radial support members, respectively. A plurality of arms are provided with means for rigidly connecting the plurality of arms to the forward radial support member and the rearward radial support member when the forward and rearward extension plates are not connected thereto, and alternatively to connect the arms to the forward and rearward extension plates when the extension plates are connected to the support members. The arms are disposed around the corresponding circumferences and extend longitudinally along the mandrel.

In another aspect of the invention, the mandrel further includes an elastomeric diaphragm affixed with respect to the arms and having a circular profile for forming a fluid seal along the internal surface of the pipe to be inspected. The diaphragm is of single piece construction and includes a center plate and a diaphragm surface extending radially outward from the center plate and tapering in thickness from the center plate to the outer perimeter of the diaphragm.

An object of the present invention is to provide an improved pipe inspection method and device. Related objects and advantages of the present invention are disclosed in the following description of the preferred embodiments.

DESCRIPTION OF THE PREFERRED EMBODIMENTS

Figure 1:
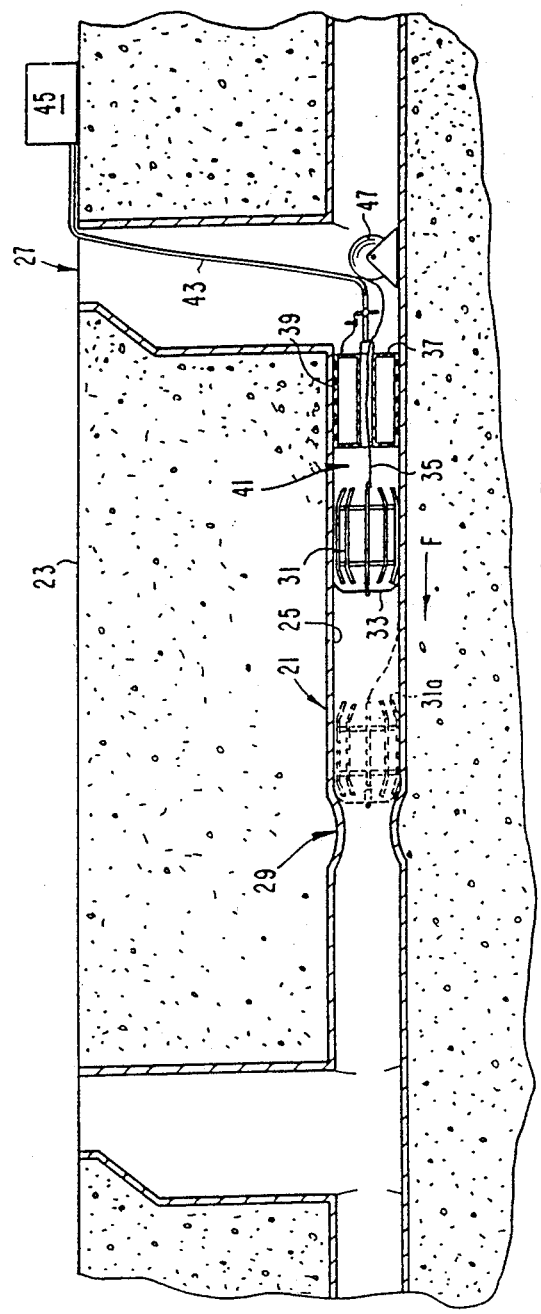
FIG. 1 is a side, partial sectional view of the device of the present invention shown in a cutaway sewer pipe.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

Referring to FIGS. 1–4, the device of the present invention is shown in sewer pipe 21. Sewer pipe 21 is located beneath ground surface 23 and has an internal pipe surface 25. Typically, pipe 21 and internal pipe surface 25 are circular in cross-section when not deformed. Sewer pipe 21 is located in and accessed by sewer manholes, such as sewer manhole 27. As previously discussed, deformations in pipe 21, such as cross-sectional deformation 29, may occur due to soil loading or other stresses. Typically, deformation 29 results in a loss of circularity, and may cause the internal cross-section to take on an oblong or oval shape.

Mandrel 31 includes an elastomeric diaphragm 33 typically made of flexible plastic, rubber or a similar compound. In the preferred embodiment, elastomeric diaphragm has a circular profile (see FIGS. 3 and 4) to correspond with the profile of the internal surface of the pipe to be inspected. Diaphragm 33 forms a mandrel fluid seal, such as seal 34, with internal pipe surface 25. This seal is sufficiently tight to prevent a significant flow of pressurized fluid, such as compressed air, from crossing the seal, and yet is not so tight as to significantly inhibit movement of diaphragm 33 and seal 34 across internal pipe surface 25. Diaphragm 33 is preferably attached to the rest of mandrel 31 at connection 61 in the axial center of the mandrel.

Mandrel 31 has retrieval cord 35 attached thereto at connection 63. Retrieval cord 35 trails along behind mandrel 31 and is pulled thereby.

Plug member 37 is located behind mandrel 31 and, as illustrated in FIG. 1, is fixed in place along the internal pipe surface 25 of pipe 21. Such fixation is preferably defined by plug fluid seal 39 forming a fluid tight friction fit between plug member 37 and internal pipe surface 25. A pressurizing space 41 is defined between mandrel fluid seal 34, plug fluid seal 39, and internal pipe surface 25. Pressurizing space 41 is pressurized with fluid, such as compressed air, to propel mandrel 31 along the length of the pipe for inspection. Compressed air is supplied by common pressure line 43 which in turn is connected to a pressurized fluid source such as air compressor 45.

Preferably, retrieval cord 35 passes through plug member 37 and is reeled and unreeled upon retrieval cord reel 47 (see FIG. 1). As pressurizing space 41 is filled with compressed air, mandrel 31 advances forwardly in the direction "F". Mandrel 31 continues to advance until it reaches cross-sectional deformation 29 at which location its progress is blocked as shown as mandrel 31a in phantom lines. During such advancement, retrieval cord is pulled along behind the mandrel, unreeling from reel 47.

Figure 2:
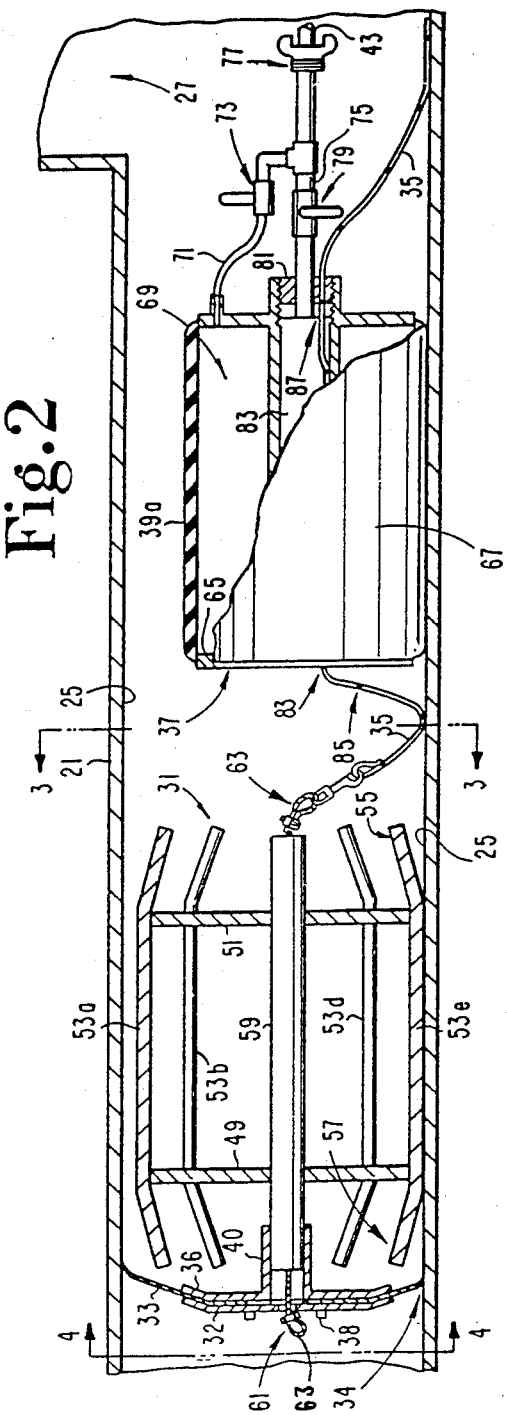
FIG. 2 is a side, partial cutaway, detail view of the device of one embodiment of the present invention.
Figure 4:
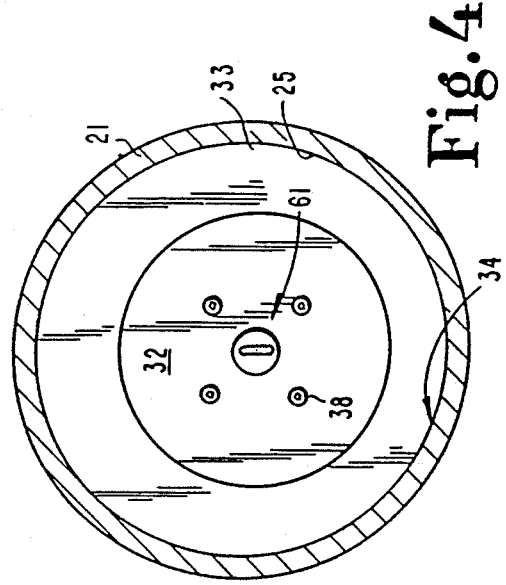
FIG. 4 is a front view of the mandrel of the one embodiment taken from the perspective of line 4—4 in FIG. 2.
Figure 3:
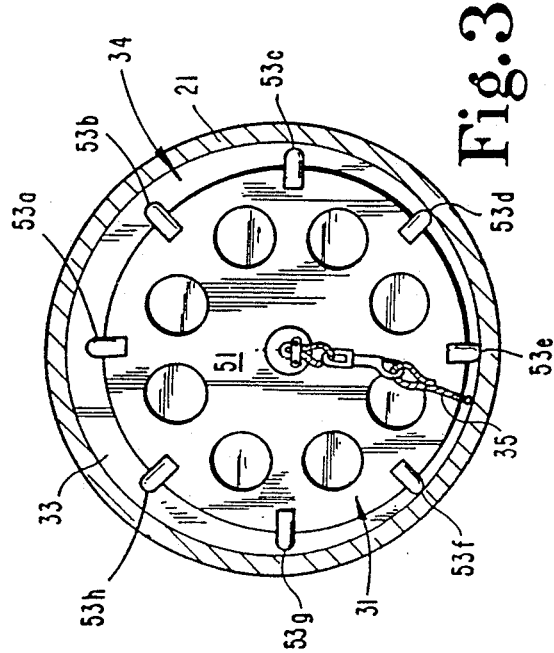
FIG. 3 is a rear view of the mandrel of the one embodiment taken from the perspective of line 3—3 in FIG. 2.

Referring more specifically to FIGS. 2-4, mandrel 31 may comprise a modified version of a type of mandrel offered by Wortco, Inc. of Franklin, Ohio. Such mandrel includes the forward radial support member 49, a rearward radial support member 51, and a plurality of arms, 53a, 53b, 53c, 53d, 53e, 53f, 53g, and 53h disposed around the circumference of support member 49 and the circumference of support member 51. Preferably, there are at least eight such arms which run longitudinally. Each of such arms has a rear end, such as rear end 55, which is bent radially inward. Similarly, each of such arms has a front end, such as front end 57, which is also bent radially inward. Furthermore, axial core 59 is provided between support members 49 and 51 and along the axial center of mandrel 31. The mandrel has elastomeric diaphragm 33 coupled thereto at connection 61. As illustrated, elastomeric diaphragm 33 is shown in the forward most position, in front of the arms, but optionally may be provided at other locations. Accordingly, mandrel 31, as illustrated, forms a rigid cage with an elastomeric diaphragm thereon. The cage is preferably made of rigid plastic, steel or a similar such rigid material.

Figure 5:
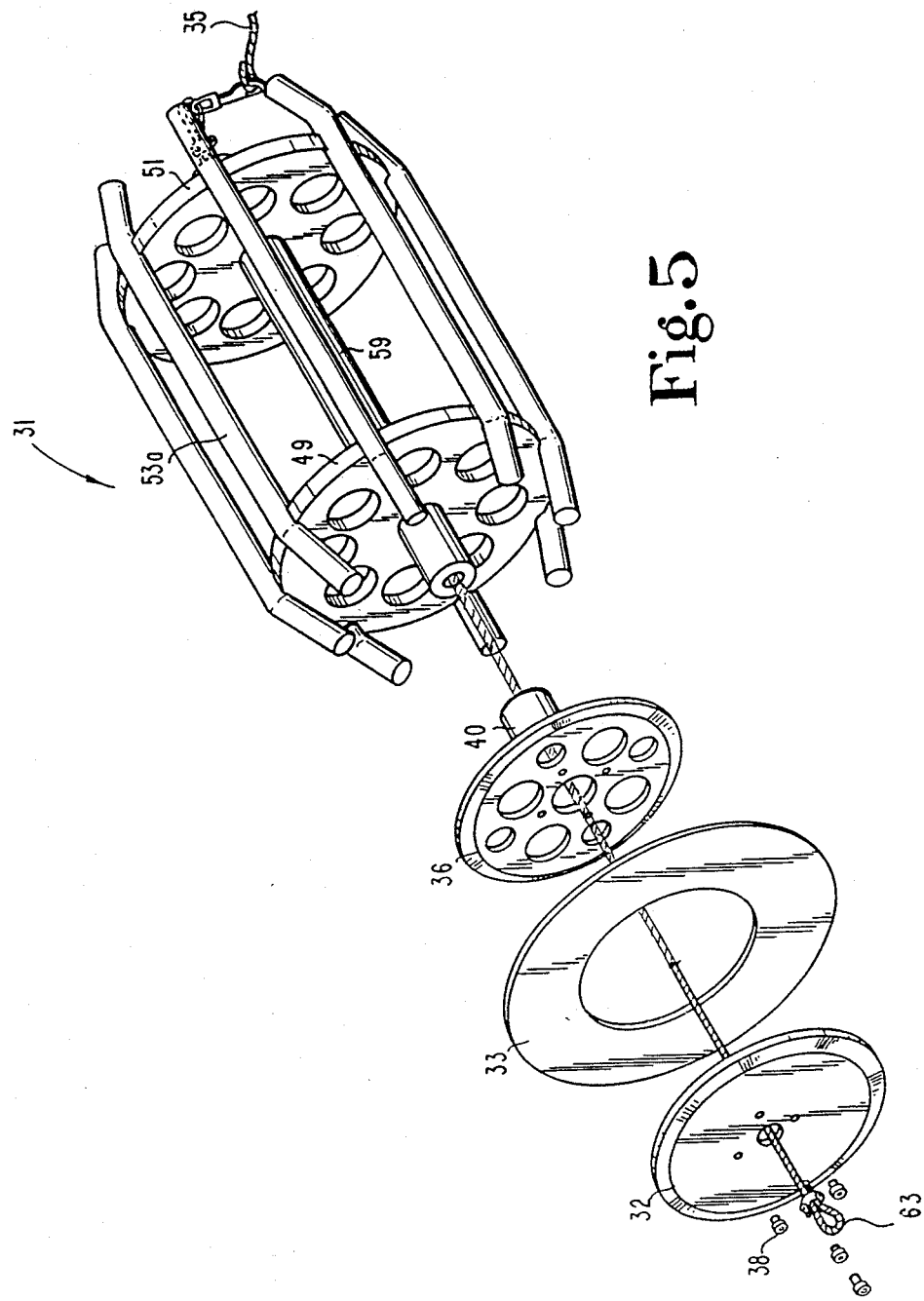
FIG. 5 is an exploded front perspective view of the mandrel of the one embodiment of the present invention.

Referring particularly to FIGS. 2 and 5, mandrel 31 is shown with its elastomeric diaphragm assembly. Elastomeric diaphragm 33 is affixed to the remainder of mandrel 31 by screws, such as screw 38, holding front plate 32 together with back plate 36 with diaphragm 33 sandwiched therebetween. Back plate 36 has sheath 40 which is affixed around axial core 59. A variety of other diaphragm assemblies are possible while being within the scope of the present invention.

FIG. 2 illustrates plug member 37 in a deflated, or unexpanded state. This is in contrast to FIG. 1 which illustrates plug member 37 inflated and expanded, forming plug fluid seal 39. FIG. 2 illustrates plug member 37 partially cutaway having plug frame 65 covered by flexible plug cover 67. Plug frame 65 is typically formed of metal, whereas flexible plug cover 67 is formed of a flexible, elastomeric substance to allow expansion. Inflation, and accordingly, expansion, is provided by pressurizing inflatable expanding vessel 69 defined in the annular space between plug frame 65 and flexible plug cover 67. By so doing, vessel 69 expands, causing the plug to expand around its circumference, such as at 39a, until it engages internal pipe surface 25, forming plug fluid seal 39. Plug member 37 is a modified version of a plug offered by Cherne Industries, Inc. In particular, adapted fitting 81 is provided, which includes cord hole 87 longitudinally therethrough. Fitting 81 has a threaded external surface to be threaded into the female threads provided on plug frame 65. Chord hole 87 allows cord 35 to run from central opening 83 through fitting 81 to a location behind plug member 37. Adapted fitting 81 also includes pressure line branch 75 attached thereto for providing compressed air through central opening 83 into pressurizing space 41. Central opening 83 is preferably along a longitudinally central axis of plug member 37.

Compressed air for inflating inflatable expanding vessel 69 is provided through pressure line branch 71 which is valved by valve 73. Preferably, valve pressure line branch 71 is a quarter inch air line and valve 73 is a quarter inch valve. Similarly, a separate pressure line branch 75 is provided (preferably a three quarter inch galvanized pipe) having a valve 79 (preferably a three quarter inch valve) therein. Each of these branches is preferably supplied with compressed air from common pressure line 43 which is attached thereto by pressure line adaptor fitting 77. In this way, independent control of pressurizing inflatable expanding vessel 69 or pressurizing space 41 may be achieved while only requiring a single, common pressure line 43.

Retrieval cord 35 may be provided with distance markings, such as distance marking 85. Such markings enable the operator to measure the distance along the pipe which mandrel 31 has traveled, and accordingly gauge the approximate location of a deformation, such as deformation 29.

The method of utilizing the device for the present invention is as follows. First, mandrel 31 and plug member 37 are typically lowered into a manhole to access the sewer pipe. Mandrel 31 is inserted into pipe 21 with elastomeric diaphragm 33 providing a fluid seal engaging internal pipe surface 25. Retrieval cord 35 is attached to mandrel 31 and trails behind the mandrel. Next, plug member 37 is inserted into pipe 21 and fixed in place. Such fixing may be accomplished by inflating inflatable expanding vessel 69 by providing pressurized air therein. Such expanding causes plug fluid seal 39 to be defined between plug member 37 and internal pipe surface 25. Next, mandrel 31 is propelled along the pipe away from plug member 37 by pressurizing the pressurizing space 41. Such pressurizing of space 41 is accomplished by opening valve 79, allowing compressed air from air compressor 45 to flow into space 41. Accordingly, mandrel 31 is propelled under pressure forwardly in the direction "F", as illustrated in FIG. 1. Such forward propulsion moves the mandrel along as pressure is maintained until either the mandrel encounters a deformation, such as deformation 29, or until the cord 35 runs out of length. If a deformation is encountered, the operator may note the location of the deformation, by checking distance markings. Thereafter, pressure in pressurizing space 41 is turned off and mandrel 31 is retrieved by pulling on retrieval cord 35 back towards plug member 37. As can be understood from the previous description, this method may be conducted from a singular location at sewer manhole 27. If the mandrel advances the full length of the pipe, the mandrel is removed at the next manhole.

A collateral benefit which may be realized from utilization of the present invention is that ruptures or other leaks in sewer line 21 may be detected. More specifically, as mandrel 31 advances along the pipe, if mandrel fluid seal 34 passes across a rupture or hole in pipe 21, it may be difficult to maintain pressure in space 41. If a sudden pressure loss is experienced, the operator may determine that a rupture or hole is present. By noting the distance which cord 35 has been advanced into the pipe, the operator may determine the location of the hole.

In a second embodiment of the device of the present invention, as illustrated with reference to FIGS. 6-8, a mandrel 131 is configured to permit modification of the mandrel for use with larger diameter pipes. In one specific embodiment, a mandrel, such as mandrel 31 of the previous embodiment, is dimensioned for use with a eight inch diameter pipe. In order to accommodate a larger diameter pipe, such as a nine or ten inch diameter, a different mandrel 31 of larger size must be produced to fit the pipe. On the other hand, the mandrel 131 of the second embodiment of the invention can be provided to eliminate the need to replace the entire mandrel depending on the pipe diameter.

The mandrel 131 forms a rigid cage with an elastomeric diaphragm attached thereon. The mandrel includes a number of arms 153a–153h, which are substantially similar in construction to the arms 53a–53h of the previously described mandrel 31. A forward support member 149 and a rearward support member 151 are provided which are similar to the forward and rearward support members 49 and 51. However, the forward and rearward support members 149 and 151 include a number of circumferentially spaced threaded bores 149a and 151a, respectively. The threaded bores 149a and 151a are arranged to correspond with the number of arms 153a–153h, so that in one specific embodiment eight bores are equally circumferentially spaced around the outer perimeter edge of the forward and rearward support members to correspond to the number of arms 153a–h. Each of the arms 153a–153h includes a pair of chamfered openings to accommodate a screw 154 therethrough which is threaded into an appropriate threaded bore 149a and 151a of the support members.

In order to adapt the mandrel 131 for use in a larger diameter pipe, an extension plate is provided for each of the forward and rearward support members. A forward extension plate 150 is provided for engagement with the rearward support member 151. The extension plates 150 and 152 themselves include a number of circumferentially spaced threaded bores 150a and 152a, respectively, at the outer perimeter edge of the plates which are adapted for attachment of the arms 153a–153h by screws 154. The extension plates 150 and 152 each have an outer diameter that is greater than the outer diameter of the forward and rearward support members so that when the arms are attached the mandrel has a larger diameter for inspecting larger diameter pipes.

An annular ledge 150b and 152b is formed in the extension plates 150 and 152, respectively, within which a corresponding support member 149 and 151 is nested. In the specific illustrated embodiment of FIGS. 6 and 7, the mandrel and particularly the extension plates are sized to fit a ten inch diameter tube. Other extension plates of similar design can be provided having a larger outer diameter. The extension plates are affixed to the corresponding forward and rearward support members by way of threaded plugs 155 passing through the annular ledges 150b and 152b. In the preferred embodiment, three such plugs are used to attach the extension plates to the support members at equally spaced locations around the plates.

The forward and rearward support members 149 and 151 include a number of openings 149b and 151b evenly distributed on the members which correspond to the openings shown in plates 49 and 51 in FIG. 3 of the previous embodiment. These openings provide a fluid path for the pressurizing fluid to engage the diaphragm. Likewise, the annular ledges 150b and 152b of the forward and rearward extension plates define a corresponding central opening 150b and 152 which is large enough in diameter to encompass the spaced openings 149b and 151b in the forward and rearward support members. Thus, an unobstructed path is provided for flowing the pressurizing fluid to the diaphragm.

The forward and rearward support members 149 and 151 are maintained in their longitudinally spaced apart relation by a center spacer tube 160. An end spacer tube 161 is situated at the opposite face of the rearward support member 151 and held in position with respect to the support member by way of a dowel pin 164 passing through the support member and pressed into corresponding bores in the end spacer tube 161 and center spacer tube 160, as shown in FIG. 6. An alignment post 159 extends through the center tube 160 and the end spacer 161 and projects forward from the forward face of forward support member 149. An extension tube 162 is welded to the alignment post 151, and a stiffener tube 163 is welded to the outer surface of the extension tube to form an integral assembly. The extension tube 162 is also engaged with the forward support member 149 and the center spacer 160 by way of a dowel pin 164 passing through the support member and pressed into corresponding bores in the center spacer and extension tube. The stiffener tube 163 provides rigidity for the extension tube 162 and alignment post 159.

The mandrel 131 may be provided with a number of extension plates, such as extension plates 150 and 152, that have various outer diameters to accommodate several pipe geometries. Each of the extension plates are interchangeably affixed to the forward and rearward support members 149 and 151 in the manner described above. Thus, it is seen that a number of pipe diameters can be accommodated by a single basic mandrel construction requiring only the replacement of the extension plates 150 and 152. The forward and rearward support members 149 and 151, the alignment post 159 and its components, the spacer tubes 160 and 161, and the number of arms 153a–153h are common to all mandrel figurations regardless of the diameter of the pipe to be inspected. This represents a significant decrease in cost to the user since only a few replacement extension plates need be kept on hand. In addition, the mandrel 131 of the second embodiment represents a relatively quick and simple way of accommodating different diameter pipes for inspection. In the preferred embodiment, the mandrel 131 and its components are preferably made of a rigid plastic, steel or other similar rigid material.

Figure 6:
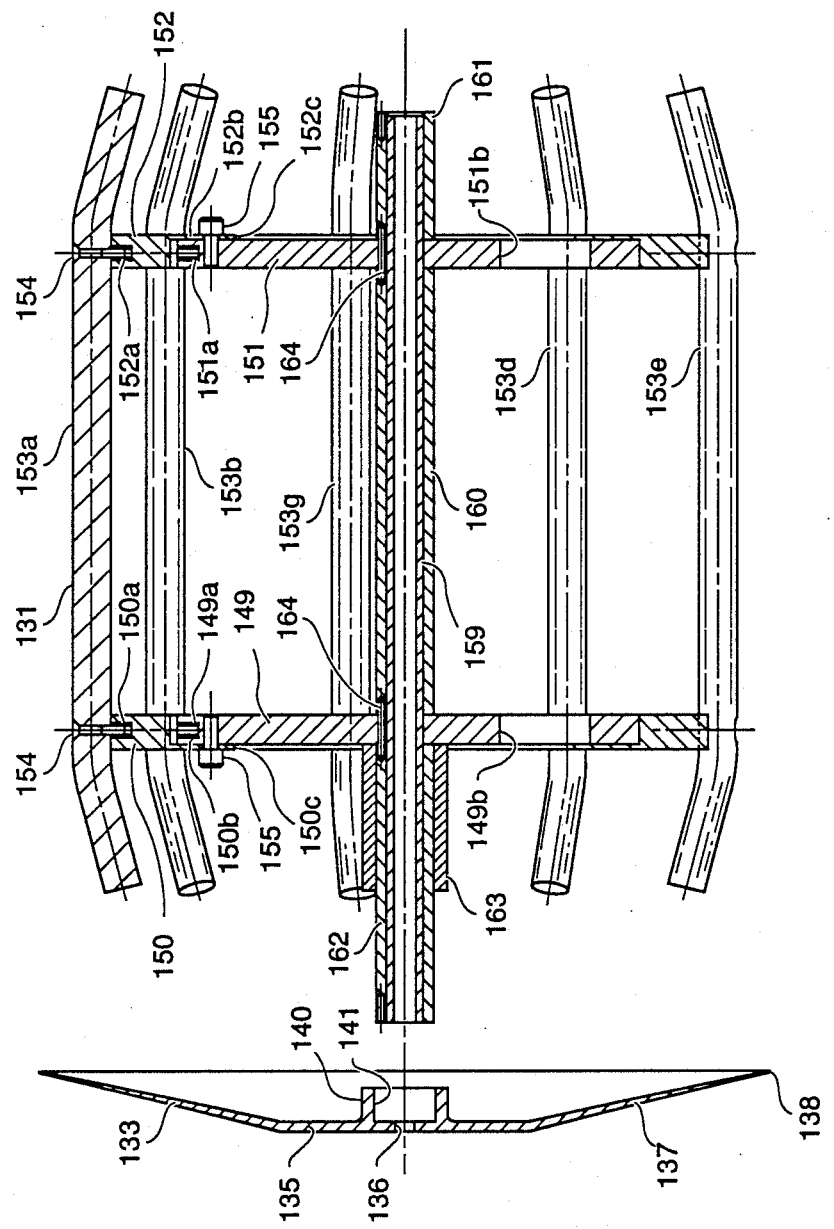
FIG. 6 is a side, partial cutaway, detail view of the device of another embodiment of the present invention.
Figure 7:
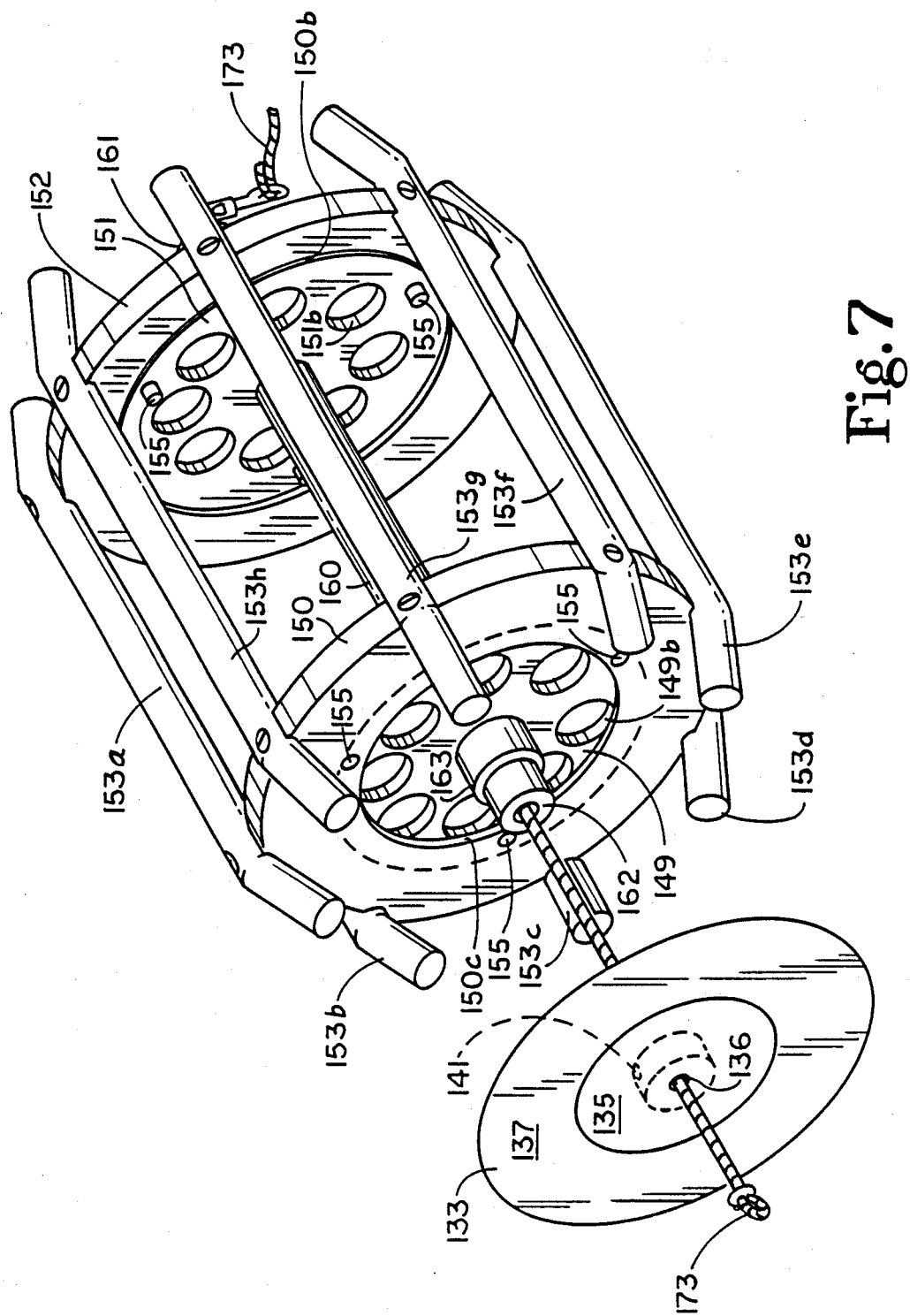
FIG. 7 is an exploded front perspective view of the mandrel of the other embodiment of the present invention.
Figure 8:
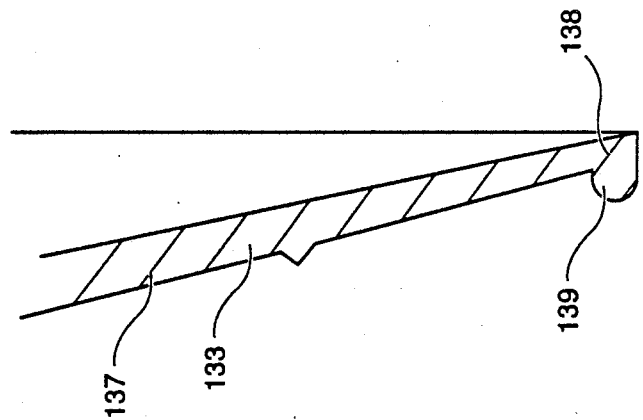
FIG. 8 is a enlarged view of the device of the rim portion of the diaphragm of the other embodiment of FIG. 6.

The mandrel 131 of the embodiment illustrated in FIGS. 6–8 includes a diaphragm 133 of a design different from the diaphragm 33 of the former embodiment. Diaphragm 133 is formed in an integral single piece construction as opposed to the multi-piece construction of the previous device. However, the diaphragm 133 operates in a manner substantially similar to the diaphragm 33 in that it forms a mandrel fluid seal with the internal pipe surface. It is also understood that a diaphragm according to diaphragm 133 may be used with the mandrel 31 of the former embodiment. The diaphragm 133 includes a center plate 135, which generally replaces the front and back plates 32 and 36 of the previous embodiment. The center plate 135 includes a retrieval cord opening 136 through which a retrieval cord 173, which is similar to retrieval cord 63 of the previous embodiment, may extend to exert pressure against the diaphragm to hold it in position against mandrel 131.

The diaphragm 133 also includes a sheath 140 which is integrally formed with the center plate 135. The sheath 140 forms an inner mounting surface 141 which is adapted to be firmly engaged, such as in a press-fit, about the extension tube 162 of mandrel 131. The diaphragm 133 includes a diaphragm surface 137 which extends from the center plate 135 to the perimeter edge 138 which contacts the inner wall of the pipe to be inspected. The diaphragm surface 137 is sloped rearward from the center plate, at a twelve degree angle in one specific embodiment to form a shallow truncated cone opening rearward. The truncated conical shape of the diaphragm enhances its ability to be conveyed along the pipe and improves the seal formed between the perimeter edge 138 and the inner wall of the pipe.

The diaphragm surface is of decreasing thickness from the center plate to the perimeter edge 138. In order to enhance the seal around the perimeter of the diaphragm 133, the perimeter edge includes an enlarged rim portion 139, shown in FIG. 8, which increases the sealing surface area as the diaphragm surface 137 bows outwardly under pressure of the pressurized fluid.

In one specific embodiment, the center plate 135 has a thickness of approximately 0.126 inches and the diaphragm surface 137 decreases from that thickness to a thickness of about 0.010 inches at the perimeter edge 138. The angle of slope and the thickness of the diaphragm surface 137 is calibrated in the specific illustrated embodiment to meet certain performance standards. Other dimensions of the diaphragm 133 may be derived and still fall within the scope of the invention to meet other pipe inspection considerations.

The diaphragm 133 is preferably composed of a flexible elastomeric material. For instance, the diaphragm 133 may be composed of a hard rubber that is fairly rigid in the region of the center plate 135 but flexible in the diaphragm surface 137 of the plate to permit the diaphragm surface to balloon outward upon application of pressure from inside the diaphragm 133. In addition, the diaphragm 133 may be sufficiently rigid to push debris out of the pipe as the inspection mandrel is advanced along the pipe.

Several sizes of diaphragms may be provided with various outer diameters to accommodate several diameters of pipes to be inspected. Preferably, a diaphragm of specific outer diameter will be supplied with extension plates of corresponding diameters in a matched set so that the inspection device can be readily converted for use with various pipe diameters. The diaphragm 131 may be easily replaced by removing the diaphragm from the extension tube 162 and pushing the sheath 140 of another diaphragm onto the tube. A cotter pin of other suitable means may be provided for securing the sheath to the extension tube in addition to or in lieu of the press-fit.

The mandrel 131 and diaphragm 133 shown in FIGS. 6-8 are used to inspect pipes in a manner similar to the mandrel 31 and diaphragm 33 of the embodiment shown in FIGS. 1-5. A retrieval cord 173, similar to cord 63, may be extended through the alignment post 159 and the retrieval cord opening 136 in the diaphragm 133, as shown in FIG. 7, to secure the diaphragm and provide means to retrieve the device when inspection is complete.

While the invention has been illustrated and described in detail in the drawings and foregoing description, the same is to be considered as illustrative and not restrictive in character, it being understood that only the preferred

What is claimed is:

1. A mandrel for use in inspecting the internal cross-section shape of pipes comprising:
    a forward radial support member having a first circumference;
    a rearward radial support member having a second circumference;
    a plurality of arms rigidly connected to said forward radial support member and to said rearward radial support member, said arms being disposed around said first circumference and around said second circumference, wherein said arms run longitudinally between said forward and rearward support members, and wherein said arms are bent radially inward at a front end near said forward radial support member, and wherein said arms are bent radially inward at a rear end near said rearward radial support member; and
    an elastomeric diaphragm fixed with respect to said arms and having a circular profile for forming a fluid seal along the internal surface of the pipe to be inspected.

2. The mandrel of claim 1 wherein said elastomeric diaphragm is positioned in front of said front ends of said arms.

3. The mandrel of claim 2 and further comprising a retrieval cord attached to the mandrel and trailing behind said arms.

4. The mandrel of claim 3 wherein said plurality of arms comprise at least eight arms.

5. The mandrel of claim 1 and further comprising a retrieval cord attached to the mandrel and trailing behind said arms.

6. The mandrel of claim 1 wherein said plurality of arms comprise at least eight arms.

7. A mandrel for use in inspecting the internal cross-sectional shape of pipes comprising:
    a forward radial support member having a first circumference;
    a rearward radial support member having a second circumference;
    said first circumference and second circumference having a first diameter;
    a forward extension plate having a third circumference;
    a rearward extension plate having a fourth circumference;
    said third and fourth circumferences having a diameter larger than said first diameter of said first and second circumferences;
    means for attaching said forward and rearward extension plates to said forward radial support member and said rearward radial support member, respectively;
    a plurality of arms;
    means for rigidly connecting said plurality of arms at said first circumference of said forward radial support member and at said second circumference of said rearward radial support member when said forward and rearward extension plates are not connected thereto, and for rigidly connecting said arms at said third circumference of said forward extension plate and at said fourth circumference of said rearward extension plate when said extension plates are connected to said support members, wherein said arms run longitudinally between said forward and said rearward radial support members; and
    a diaphragm affixed with respect to said arms and having a circular profile for forming a fluid seal along the internal surface of the pipe to be inspected.

8. The mandrel of claim 7 wherein:
    each of said arms includes a front end near said forward radial support member; and
    said diaphragm is positioned in front of said front ends of said arms.

9. The mandrel of claim 8 further comprising a retrieval cord attached to the mandrel and trailing behind said arms.

10. The mandrel of claim 9 wherein said plurality of arms includes at least eight arms.

11. The mandrel of claim 7 further comprising a retrieval cord attached to the mandrel and trailing behind said arms.

12. The mandrel of claim 7 wherein said plurality of arms includes at least eight arms.

13. The mandrel of claim 7 wherein said diaphragm is configured in a shallow truncated conical shape.

14. The mandrel of claim 13 wherein said diaphragm includes a perimeter edge for sealing engagement with the pipe, said perimeter edge having an enlarged rim.

15. The mandrel of claim 13 wherein said diaphragm is of one-piece construction including said sheath.

16. The mandrel of claim 7 further comprising:
an alignment post:
means for attaching said forward radial support member and said rearward radial support member to said alignment post in longitudinally spaced apart relation such that said alignment post includes a portion extending in front of said front ends of said arms; and
a sheath associated with said diaphragm for removably engaging said diaphragm to said alignment post.

17. The mandrel of claim 16 wherein:
said alignment post includes a passageway therethrough;
said diaphragm includes a centrally located opening therethrough; and
said retrieval cord extends through said passageway and through said opening in said diaphragm and includes means for engaging said diaphragm.

18. A mandrel for use in inspecting the internal cross-sectional shape of pipes comprising:
a cage including a longitudinal axis and a first mounting circumference radially disposed from said longitudinal axis at a first diameter;
extension means attachable to said first mounting circumference of said cage for providing a second mounting circumference having a second diameter greater than said first diameter;
a plurality of arms;
means for rigidly connecting said plurality of arms to said first mounting circumference when said extension means is not connected thereto, and for rigidly connecting said arms to said second mounting circumference of said extension means said extension means is attached to said first mounting circumference, wherein said arms run generally parallel to said longitudinal axis; and
a diaphragm affixed with respect to said arms and having a circular profile for forming a fluid seal along the internal surface of the pipe to be inspected.

* * * * *